United States Patent
Dai et al.

(10) Patent No.: US 12,192,941 B2
(45) Date of Patent: Jan. 7, 2025

(54) METHOD AND APPARATUS FOR DETERMINING TIMING ADVANCE, AND DEVICE AND MEDIUM

(71) Applicant: ZTE Corporation, Shenzhen (CN)

(72) Inventors: Bo Dai, Shenzhen (CN); Kun Liu, Shenzhen (CN); Liujun Hu, Shenzhen (CN); Guanghui Yu, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 363 days.

(21) Appl. No.: 17/776,986

(22) PCT Filed: Dec. 15, 2020

(86) PCT No.: PCT/CN2020/136422
§ 371 (c)(1),
(2) Date: May 13, 2022

(87) PCT Pub. No.: WO2021/121208
PCT Pub. Date: Jun. 24, 2021

(65) Prior Publication Data
US 2022/0417885 A1    Dec. 29, 2022

(30) Foreign Application Priority Data
Dec. 16, 2019 (CN) .......................... 201911296669.9

(51) Int. Cl.
*H04W 56/00* (2009.01)
*H04W 16/28* (2009.01)
(Continued)

(52) U.S. Cl.
CPC ....... *H04W 56/0045* (2013.01); *H04W 16/28* (2013.01); *H04W 24/10* (2013.01);
(Continued)

(58) Field of Classification Search
CPC . H04W 56/0045; H04W 76/20; H04W 16/28; H04W 24/10; H04W 56/001; H04W 74/0833
See application file for complete search history.

(56) References Cited

U.S. PATENT DOCUMENTS 10,368,351 B1 * 7/2019 Syed .................... H04W 72/51
2013/0235858 A1   9/2013 Zhao et al.
(Continued)

FOREIGN PATENT DOCUMENTS

CN    102469568 A    5/2012
CN    108377577 A    8/2018
(Continued)

OTHER PUBLICATIONS

Extended European Search Report for European Application No. 20901487.7, dated Jan. 4, 2024.
(Continued)

*Primary Examiner* — Michael J Moore, Jr.
(74) *Attorney, Agent, or Firm* — Wolf, Greenfield & Sacks, P.C.

(57) ABSTRACT

A method and an apparatus for determining a timing advance, and a device and a non-transitory computer-readable storage medium. The method may include: obtaining, by a terminal device, timing advance (TA) list information, where the TA list information is sent to the terminal device by a base station or is configured by default to be stored in the terminal device, and the TA list information indicates at least one TA list, each TA list including at least one TA value; obtaining, by the terminal device, a target TA value according to the TA list information; and adjusting, by the terminal device, a TA for uplink channel transmission using the target TA value.

12 Claims, 4 Drawing Sheets

(51) Int. Cl.
*H04W 24/10* (2009.01)
*H04W 74/0833* (2024.01)
*H04W 76/20* (2018.01)

(52) U.S. Cl.
CPC ..... *H04W 56/001* (2013.01); *H04W 74/0833* (2013.01); *H04W 76/20* (2018.02)

(56) References Cited

U.S. PATENT DOCUMENTS

| | | | |
|---|---|---|---|
| 2019/0223095 A1* | 7/2019 | Yu | H04W 74/08 |
| 2019/0274180 A1* | 9/2019 | Yu | H04W 24/10 |
| 2020/0154239 A1* | 5/2020 | Yamada | H04W 4/029 |
| 2021/0168869 A1* | 6/2021 | Gupta | H04L 27/2607 |
| 2021/0345233 A1* | 11/2021 | Singh | H04W 24/02 |
| 2022/0225258 A1* | 7/2022 | Ratasuk | H04W 56/0045 |
| 2022/0394519 A1* | 12/2022 | Thangarasa | H04L 43/16 |
| 2022/0417885 A1* | 12/2022 | Dai | H04W 56/001 |

FOREIGN PATENT DOCUMENTS

| | | |
|---|---|---|
| CN | 110062455 A | 7/2019 |
| CN | 111093261 A | 5/2020 |
| EP | 3 509 365 A1 | 7/2019 |
| EP | 3 531 791 A1 | 8/2019 |
| WO | WO 2018/059329 A1 | 4/2018 |

OTHER PUBLICATIONS

[No Author Listed] 3GPP TSG RAN WG1 #97. R1-1907039, Agenda Item 7.2.5.3, Consideration on uplink timing advance and RACH procedure for NTN. May 13-17, 2019:1-3.
First Examination Report for Australian Patent Application No. 2020408618, mailed Jan. 30, 2023.
First Office Action for Chinese Application No. 201911296669.9, dated May 26, 2023.
First Search Report for Chinese Application No. 201911296669.9, dated May 23, 2023.
Examination Report for Indian Patent Application No. 202227032559, mailed Sep. 21, 2022.
International Search Report and Written Opinion for International Application No. PCT/CN2020/136422, mailed Mar. 3, 2021.

* cited by examiner

METHOD AND APPARATUS FOR DETERMINING TIMING ADVANCE, AND DEVICE AND MEDIUM

CROSS-REFERENCE TO RELATED APPLICATION

This application is a national stage filing under 35 U.S.C. § 371 of international application number PCT/CN2020/136422, filed on Dec. 15, 2020, which claims priority to Chinese patent application No. 201911296669.9 filed on Dec. 16, 2019. The contents of these applications are incorporated herein by reference in their entirety.

TECHNICAL FIELD

The present disclosure relates to the technical field of communications, for example, to a method and an apparatus for determining a timing advance, and a device and a non-transitory computer-readable storage medium.

BACKGROUND

In the 4th Generation mobile communication technology Long Term Evolution (4G LTE) and 5G New Radio (NR) systems, it is necessary to complete uplink synchronization by means of a random access process, where the random access process includes the transmission and reception of four types of messages: Message1 (Msg1) (random access preamble), Msg2 (random access response), Msg3 (scheduled transmission) and Msg4 (contention resolution). The base station carries a timing advance (TA) in the random access response sent to User Equipment (UE) in order for the UE to adjust its uplink transmission time accordingly. It's important to speed up the uplink synchronization process of the terminal device and reduce the message overhead in the TA acquisition process.

SUMMARY

The present disclosure provides a method, an apparatus, a device, and a non-transitory computer-readable storage medium for determining a timing advance to speed up the uplink synchronization process of a terminal device and reduce the resource overhead of messages for uplink synchronization.

An embodiment of the present disclosure provides a method for determining a timing advance, which may include: obtaining, by a terminal device, timing advance (TA) list information, where the TA list information is sent to the terminal device by a base station or is configured by default to be stored in the terminal device; obtaining, by the terminal device, a target TA value according to the TA list information; and adjusting, by the terminal device, a timing advance for uplink channel transmission using the target TA value, where the TA list information indicates at least one TA list, the TA list including at least one TA value.

An embodiment of the present disclosure provides an apparatus for determining a timing advance, which may include: a TA list information obtaining module configured to obtain timing advance (TA) list information, where the TA list information is sent to the terminal device by a base station or is configured by default to be stored in the terminal device; a target TA value obtaining module configured to obtain a target TA value according to the TA list information; and a TA value adjustment module configured to adjust a timing advance for uplink channel transmission using the target TA value, where the TA list information indicates at least one TA list, the TA list including at least one TA value.

An embodiment of the present disclosure provides a communication terminal device, which may include: at least one processor; and a memory configured to store at least one program which, when executed by the at least one processor, causes the at least one processor to implement the method for determining a timing advance as described in any embodiment of the present disclosure.

An embodiment of the present disclosure provides a non-transitory computer-readable storage medium storing a computer program which, when executed by a processor, causes the processor to implement the method for determining a timing advance as described in any embodiment of the present disclosure.

DETAILED DESCRIPTION

The embodiments of the present disclosure will be described below with reference to the accompanying drawings.

Figure 1:
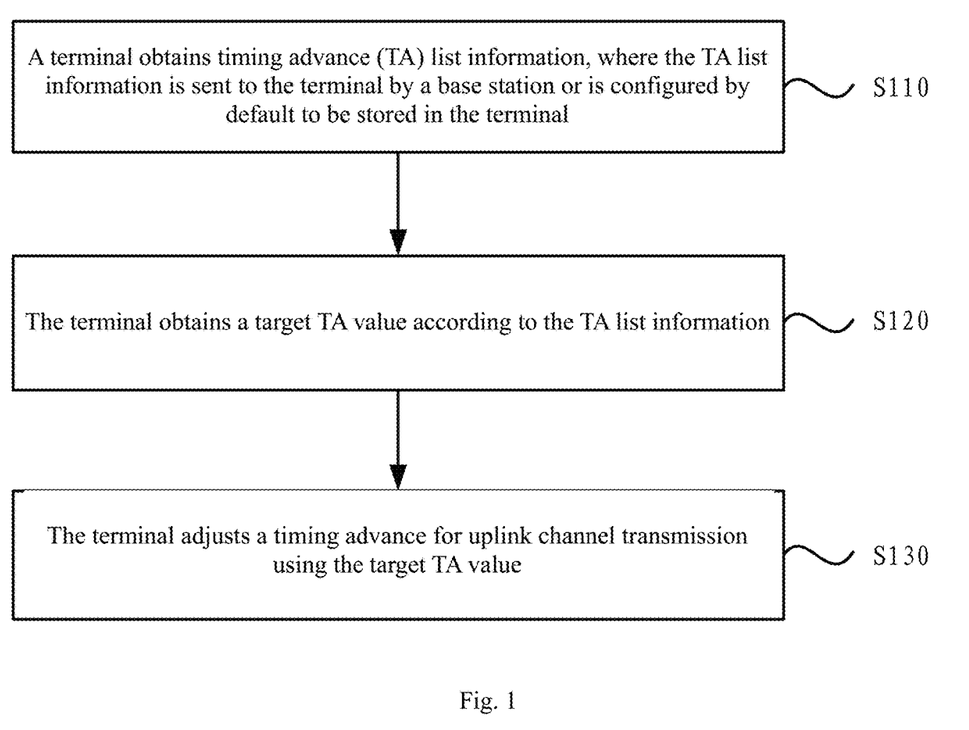
FIG. 1 is a flowchart of a method for determining a timing advance provided in the present disclosure.

In an example implementation, FIG. 1 is a flowchart of a method for determining a timing advance provided in the present disclosure. The method is applicable to the scenario where a terminal device establishes uplink synchronization with a base station. The method may be executed by the apparatus for determining a timing advance provided in the present disclosure, which may be implemented by software and/or hardware and integrated in a communication terminal device.

As shown in FIG. 1, the method for determining a timing advance provided in the present disclosure includes the following steps.

At S110, a terminal device obtains timing advance (TA) list information, where the TA list information is sent to the terminal device by a base station or is configured by default to be stored in the terminal device.

The timing advance (TA), which is generally used for UE uplink transmission, means that in order to enable UE uplink packets to reach the base station at the desired time, the radio frequency transmission delay caused by the distance is estimated and the data packets are sent out in advance by a corresponding period of time.

The TA list information, which refers to information including at least one TA value or indicating at least one TA value, may be configured by default to be stored in the terminal device or may be sent to the terminal device by the base station prior to uplink synchronization. For example, the TA list information may be sent to the terminal device by the base station during downlink synchronization of the terminal device with the base station.

The TA list information indicates at least one TA list, the TA list including at least one TA value. In response to the TA list information indicating only one TA list, this TA list may be uniquely determined based on the TA list information.

The TA list involved in this example may be a list that really exists or a virtual list that does not really exist. Here, one or more TA values may constitute a virtual TA list.

The TA list information has the following two meanings:

The first meaning: when the TA list information is configured by default to be stored in the terminal device, one or more TA lists are predefined, where each TA list includes at least one TA value and the TA list information is the index information for the one or more TA lists. The one or more TA lists may then be determined according to the TA list information. The pre-defined TA list will provide the condition or correspondence that needs to be satisfied to select a TA value.

The second meaning: when the TA list information is sent by the base station to the terminal device, the base station directly configures at least one TA value, where it may be considered that this at least one TA value constitutes one or more TA lists (or that this at least one TA value constitutes one or more virtual TA lists), which in turn may also constitute the TA list information. Here, this at least one TA value is sent by the base station to the terminal device through signaling.

In this embodiment, the terminal device is in a state of losing uplink synchronization with the base station. The terminal device may be in at least one of the following states: a radio resource control-idle (RRC-IDLE) state; an inactive state; a radio resource control-connected (RRC-CONNECTED) state, where the terminal device receives TA update trigger information or TA reconfiguration information; a radio resource control-idle (RRC_IDLE) state, where the terminal device transmits a service using a physical uplink share channel (PUSCH); a random access process, where random access information sent by the terminal device at least includes random access preamble information and load information; or autonomous transmission of a sounding reference signal (SRS).

In response to the terminal device being in the RC_CONNECTED state and the terminal device receiving the TA update trigger information or the TA reconfiguration information, the TA update trigger information or the TA reconfiguration information may be sent via Radio Resource Control (RRC) messages or via a Medium Access Control Control Element (MAC CE).

At S120, the terminal device obtains a target TA value according to the TA list information. The target TA value refers to a TA value corresponding to the terminal device that is used to implement the adjustment of the timing advance for the uplink channel transmission of this terminal device. The terminal device may obtain the target TA value according to the TA list information based on the preset correspondence.

In response to the TA list information indicating only one TA list, the terminal device obtains the target TA value directly according to this TA list. In response to this TA list including at least two TA values, the terminal device selects one of the TA values as the target TA value; and in response to this TA list only including one TA value, the terminal device acquires this TA value directly as the target TA value.

At S130, the terminal device adjusts a timing advance for uplink channel transmission using the target TA value.

After acquiring the target TA value, the terminal device uses the target TA value as the timing advance for its uplink channel transmission, that is, the terminal device performs uplink data transmission based on the target TA value.

In the technical scheme provided in this embodiment, the TA list information is configured by default to be stored in the terminal device, or the TA list information is set to be sent by the base station to the terminal device before uplink synchronization of the terminal device with the base station, so that the terminal device can directly acquire, according to the TA list information, the target TA value for adjusting the timing advance for uplink channel transmission. This technical scheme can achieve the terminal device uplink adaptive synchronization process without requiring the support of the random access process, thereby speeding up the terminal device uplink synchronization process and reducing the resource overhead of messages for uplink synchronization.

In an example, in response to the TA list information indicating at least two TA lists, obtaining, by the terminal device, a target TA value according to the TA list information includes: obtaining, by the terminal device, a target TA list according to the TA list information; and obtaining, by the terminal device, the target TA value from the target TA list.

In response to the TA list information indicating multiple TA lists, the terminal device first selects a TA list as the target TA list based on the TA list information, and then selects a TA value from the target TA list as the target TA value. In response to the selected target TA list only including one TA value, the target TA value is obtained from the target TA list, that is, the TA value included in the target TA list is used as the target TA value.

Obtaining, by the terminal device, a target TA list according to the TA list information may refer to obtaining the target TA list according to the indication of the TA list information, or may refer to obtaining the target TA list from the TA list information.

In an example, there is correspondence between the TA list and at least one of the following: at least one piece of measurement information, where the measurement information is obtained by the terminal device by measuring a reference signal or channel of a serving cell and/or a neighboring cell; at least one SS/PBCH Block (SSB) index; at least one beam direction; at least one group of channel-state information reference signals (CSI-RSs); a serving cell identifier (ID); at least one neighboring cell ID; the number of neighboring cells; or positioning information for the terminal device.

There being correspondence between the TA list and certain information means that the target TA list that the terminal device needs to use may be found based on that information and the TA list information.

The measurement information is obtained by the terminal device by measuring a reference signal or channel of a serving cell and/or a neighboring cell, where the reference signal includes at least one of SSB or CSI-RS.

In an example, the measurement information includes at least one of the following: reference signal receiving power (RSRP); reference signal receiving quality (RSRQ); or received signal strength indication (RSSI).

In 5G New Radio (NR), the primary synchronization signal (PSS), the secondary synchronization signal (SSS), and the physical broadcast channel (PBCH) together constitute an SSB.

Obtaining, by the terminal device, a target TA list according to the TA list information includes: obtaining, by the terminal device, the target TA list according to the correspondence and the TA list information.

Taking the step of obtaining, by the terminal device, the target TA list according to the correspondence between the TA list and the measurement information as well as the TA list information as an example, the terminal device obtains the target TA list according to the correspondence as well as the TA list information, that is, the terminal device uses the TA list corresponding to the measurement information as the target TA list.

In an example, in response to there being correspondence between the TA list and "at least one piece of measurement information", the terminal device may obtain the target TA list according to the correspondence between the TA list and the at least one piece of measurement information as well as the TA list information. The terminal device may obtain the target TA list according to the number of pieces of measurement information satisfying the first condition and the TA list information, where the first condition is that the value of the measurement information is greater than or equal to a determined threshold value. Each of "the number of pieces of measurement information satisfying the first condition" corresponds to at least one TA list, and thus, at least one TA list may be determined according to "the number of pieces of measurement information satisfying the first condition", and the target TA list may be determined from the at least one TA list. In response to each of "the number of pieces of measurement information satisfying the first condition" corresponding to only one TA list, one TA list may be determined according to "the number of pieces of measurement information satisfying the first condition", and this TA list is the target TA list.

In an example, in response to there being correspondence between the TA list and "at least one SSB", the terminal device may obtain the target TA list according to the correspondence between the TA list and the at least one SSB as well as the TA list information. After determining the SSB received by the terminal device, the TA list corresponding to the index of the SSB is acquired as the target TA list according to the TA list information. In this example, there is correspondence between the TA list and 2 SSBs. Assuming that the base station is configured with 4 SSBs having indexes SSB0, SSB1, SSB2, and SSB3, respectively, and defined as follows: SSB0 and SSB1 correspond to TA list 0, and SSB2 and SSB3 correspond to TA list 1. In response to the index of the SSB received by the terminal device being SSB 1, TA list 0 is the target TA list, that is, the target TA value of the terminal device exists in TA list 0; and in response to the index of the SSB received by the terminal device being SSB3, TA list 1 is the target TA list, that is, the target TA value of the terminal device exists in TA list 1.

In an example, in response to there being correspondence between the TA list and "at least one beam direction", the terminal device may obtain the target TA list according to the correspondence between the TA list and the at least one beam direction as well as the TA list information. After the terminal device selects the beam direction, the TA list corresponding to the selected beam direction is acquired as the target TA list according to the TA list information.

In this example, there is correspondence between the TA list and 1 beam direction. Assuming that the base station is configured with 4 beam directions having indexes beam direction 0, beam direction 1, beam direction 2, and beam direction 3, respectively, and defined as follows: beam direction 0 corresponds to TA list 0, beam direction 1 corresponds to TA list 1, beam direction 2 corresponds to TA list 2, and beam direction 3 corresponds to TA list 3. In response to the beam direction selected by the terminal device being beam direction 1, TA list 1 is the target TA list, that is, the target TA value of the terminal device exists in TA list 1. In this example, the base station may directly configure an explicit beam direction, and the base station may also implicitly indicate the beam direction by configuring the SSB and/or CSI-RS, that is, one SSB and/or CSI-RS corresponds to one beam direction.

In an example, in response to there being correspondence between the TA list and "at least one group of CSI-RSs", the terminal device may obtain the target TA list according to the correspondence between the TA list and the at least one group of CSI-RSs as well as the TA list information. Here, the CSI-RSs are configured by the base station. The CSI-RSs are reference signals used by the terminal device for beam management or mobility measurement.

The terminal device measures the CSI-RSs configured by the base station, where the CSI-RSs configured by the base station include at least one group of CSI-RSs, and the terminal device selects at least one group of CSI-RSs from the CSI-RSs configured by the base station, and acquires a TA list corresponding to the selected at least one group of CSI-RSs as the target TA list based on the TA list information. For example, the corresponding target TA list may be acquired according to a group identifier of the selected at least one group of CSI-RSs and the TA list information, for example, the corresponding target TA list may be acquired according to a group index of the selected at least one group of CSI-RSs and the TA list information.

The principle of the operation in which "the terminal device selects at least one group of CSI-RSs from the CSI-RSs configured by the base station" includes at least one of the following: the value of the measurement information obtained based on measurement of the CSI-RSs is greater than or equal to a determined threshold value; or the value of the measurement information obtained based on measurement of the CSI-RSs is the maximum value.

In an example, in response to there being correspondence between the TA list and "the serving cell ID", the terminal device may obtain the target TA list according to the correspondence between the TA list and the serving cell ID as well as the TA list information. That is, the TA list corresponding to the serving cell ID for the terminal device is used as the target TA list. Assuming that serving cell ID1 is defined to correspond to TA list 1 and serving cell ID2 to TA list 2. In response to the serving cell ID for the terminal device being ID1, TA list 1 is the target TA list, that is, the target TA value of the terminal device exists in TA list 1.

In an example, in response to there being correspondence between the TA list and "at least one neighboring cell ID", the terminal device may obtain the target TA list according to the correspondence between the TA list and the serving cell ID and the at least one serving cell ID and according to the TA list information. That is, the TA list corresponding to the serving cell ID and the at least one neighboring cell ID for the terminal device is used as the target TA list. Assuming that serving cell ID1 and neighboring cell ID3 are defined to correspond to TA list 1, and serving cell ID2 and neighboring cell ID4 and ID5 to TA list 2. In response to the serving cell ID for the terminal device being ID1 and neighboring cell IDs being ID4 and ID5, TA list 2 is the target TA list, that is, the target TA value of the terminal device exists in TA list 2.

In an example, in response to there being correspondence between the TA list and "the number of neighbor cells", the terminal device may obtain the target TA list according to the correspondence between the TA list and the serving cell ID and the number of neighbor cells, as well as the TA list information. That is, the TA list corresponding to the serving cell ID for the terminal device and the number of neighboring cells is used as the target TA list. Here, the number of neighboring cells is the number of neighboring cells for which measurement information satisfies a first condition, the first condition being: the value of the measurement information for the neighboring cell is greater than a determined threshold value, where the measurement information for the neighboring cell is determined through measurements by the terminal device. Assuming that serving cell ID1 and the number of neighboring cells 1 are defined to correspond to TA list 1, and serving cell ID2 and the number of neighboring cells 2 to TA list 2. In response to the serving cell ID for the terminal device being ID and the number of neighboring cells being 2, TA list 2 is the target TA list, that is, the target TA value of the terminal device exists in TA list 2.

In an example, in response to there being correspondence between the TA list and "the positioning information for the terminal device", the terminal device may obtain the target TA list according to the TA list, the positioning information for the terminal device, and the TA list information. That is, the TA list corresponding to the positioning information for the terminal device is used as the target TA list, where the positioning information for the terminal device may be information about the distance between the terminal device and the base station.

Figure 2:
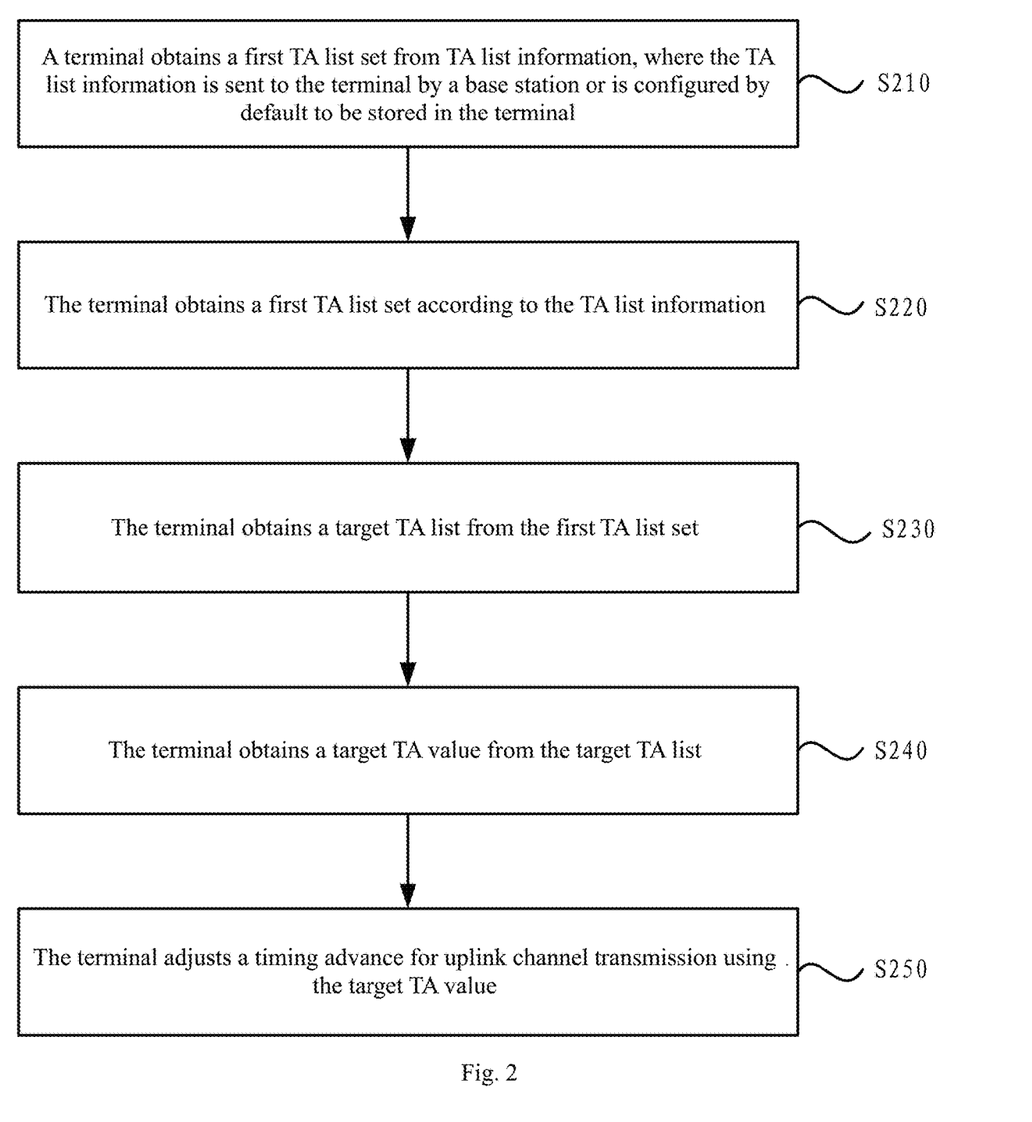
FIG. 2 is a flowchart of a method for determining a timing advance provided in the present disclosure.

In another example implementation, FIG. 2 is a flowchart of a method for determining a timing advance provided in the present disclosure. Here, Obtaining, by the terminal device, a target TA list according to the TA list information includes: obtaining, by the terminal device, a first TA list set according to the TA list information; and obtaining, by the terminal device, the target TA list from the first TA list set, where the terminal device obtains the first TA list set according to the TA list information and one of the following: a serving cell ID; a serving cell ID and a neighboring cell ID; a serving cell ID and the number of neighboring cells; or positioning information for the terminal device.

The first TA list set includes at least one TA list.

As shown in FIG. 2, the method for determining a timing advance provided in the present disclosure includes the following steps.

At S210, a terminal device obtains timing advance (TA) list information, where the TA list information is sent to the terminal device by a base station or is configured by default to be stored in the terminal device.

The TA list information indicates at least two TA lists, the TA list including at least one TA value.

At S220, the terminal device obtains a first TA list set according to the TA list information.

At least one TA list is selected as the first TA list set according to the TA list information, that is, the first TA list set includes at least one TA list.

In an example, the terminal device may obtain the first TA list set according to the serving cell ID as well as the TA list information, and the terminal device may acquire, according to the correspondence between TA lists and the serving cell ID as well as the TA list information, TA lists forming the first TA list set, that is, the TA lists corresponding to the serving cell ID for the terminal device are acquired according to the TA list information, where the set of these TA lists is the first TA list set.

In an example, the terminal device may obtain the first TA list set according to the serving cell ID and the neighboring cell ID as well as the TA list information, and the terminal device may acquire, according to the correspondence between the TA list and the serving cell ID and the neighboring cell ID as well as the TA list information, TA lists forming the first TA list set, that is, the TA lists corresponding to the serving cell ID and the neighboring cell ID are acquired according to the TA list information, where the set of these TA lists is the first TA list set.

In an example, the terminal device may obtain the first TA list set according to the serving cell ID and the number of neighboring cells as well as the TA list information, and the terminal device may acquire, according to the correspondence between the TA list and the serving cell ID and the number of neighboring cells as well as the TA list information, TA lists forming the first TA list set, that is, the TA lists corresponding to the serving cell ID and the number of neighboring cells are acquired according to the TA list information, where the set of these TA lists is the first TA list set.

In an example, the terminal device may obtain the first TA list set according to the positioning information for the terminal device as well as the TA list information, and the terminal device may acquire, according to the correspondence between the TA list and the positioning information for the terminal device, and according to the TA list information, TA lists forming the first TA list set, that is, the TA lists corresponding to the positioning information for the terminal device are acquired according to the TA list information, where the set of these TA lists is the first TA list set.

At S230, the terminal device obtains the target TA list from the first TA list set.

In response to the first TA list set only including one TA list, this TA list is the target TA list; and in response to the first TA list set only including a plurality of TA lists, a TA list is selected from the first TA list set as the target TA list.

In an example, obtaining, by the terminal device, the target TA list from the first TA list set includes: obtaining, by the terminal device, the target TA list from the first TA list set according to at least one of the following: at least one piece of measurement information; at least one SSB; at least one beam direction; or at least one group of CSI-RSs.

The measurement information is obtained by the terminal device by measuring a reference signal or channel of a serving cell and/or a neighboring cell, where the reference signal includes at least one of SSB or CSI-RS. The measurement information includes at least one of RSRP, RSRQ or RSSI.

In an example, in response to the terminal device obtaining the target TA list from the first TA list set according to "at least one piece of measurement information", the terminal device may obtain the target TA list from the first TA list set according to the correspondence between the TA list and the at least one piece of measurement information. The terminal device may obtain the target TA list from the first TA list set according to the number of pieces of measurement information satisfying the first condition, where the first condition is that the value of the measurement information is greater than or equal to a determined threshold value. Each of "the number of pieces of measurement information satisfying the first condition" corresponds to at least one TA list, and thus, at least one TA list may be determined according to "the number of pieces of measurement information satisfying the first condition", and the target TA list may be determined from the at least one TA list. In response to each of "the number of pieces of measurement information satisfying the first condition" corresponding to only one TA list, one TA list may be determined according to "the number of pieces of measurement information satisfying the first condition", and this TA list is the target TA list.

In an example, in response to the terminal device obtaining the target TA list from the first TA list set according to "at least one SSB", the terminal device may obtain the target TA list from the first TA list set according to the correspondence between the TA list and the at least one SSB. After determining the SSB received by the terminal device, the TA list corresponding to the index of the SSB is acquired as the target TA list from the first TA list set. In this example, there is correspondence between the TA list and 2 SSBs. Assuming that the base station is configured with 4 SSBs having indexes SSB0, SSB1, SSB2, and SSB3, respectively, and defined as follows: SSB0 and SSB 1 correspond to TA list 0, and SSB2 and SSB3 correspond to TA list 1. In response to the index of the SSB received by the terminal device being SSB1, TA list 0 is the target TA list, that is, the target TA value of the terminal device exists in TA list 0; and in response to the index of the SSB received by the terminal device being SSB3, TA list 1 is the target TA list, that is, the target TA value of the terminal device exists in TA list 1.

In an example, in response to the terminal device obtaining the target TA list from the first TA list set according to "at least one beam direction", the terminal device may obtain the target TA list from the first TA list set according to the correspondence between the TA list and the at least one beam direction. After the terminal device selects the beam direction, the TA list corresponding to the selected beam direction is acquired as the target TA list from the first TA list set. In this example, there is correspondence between the TA list and 1 beam direction. Assuming that the base station is configured with 4 beam directions having indexes beam direction 0, beam direction 1, beam direction 2, and beam direction 3, respectively, and defined as follows: beam direction 0 corresponds to TA list 0, beam direction 1 corresponds to TA list 1, beam direction 2 corresponds to TA list 2, and beam direction 3 corresponds to TA list 3. In response to the beam direction selected by the terminal device being beam direction 1, TA list 1 is the target TA list, that is, the target TA value of the terminal device exists in TA list 1. In this example, the base station may directly configure an explicit beam direction, and the base station may also implicitly indicate the beam direction by configuring the SSB and/or CSI-RS, that is, one SSB and/or CSI-RS corresponds to one beam direction.

In an example, in response to the terminal device obtaining the target TA list from the first TA list set according to "at least one group of CSI-RSs", the terminal device may obtain the target TA list from the first TA list set according to the correspondence between the TA list and the at least one group of CSI-RSs. Here, the CSI-RSs are configured by the base station. The CSI-RSs are reference signals used by the terminal device for beam management or mobility measurement.

The terminal device measures the CSI-RSs configured by the base station, where the CSI-RSs configured by the base station include at least one group of CSI-RSs, and the terminal device selects at least one group of CSI-RSs from the CSI-RSs configured by the base station, and acquires a TA list corresponding to the selected at least one group of CSI-RSs as the target TA list from the first TA list set. For example, the corresponding target TA list may be acquired according to a group identifier of the selected at least one group of CSI-RSs from the first TA list set, for example, the corresponding target TA list may be acquired according to a group index of the selected at least one group of CSI-RSs from the first TA list set.

The principle of the operation in which "the terminal device selects at least one group of CSI-RSs from the CSI-RSs configured by the base station" includes at least one of the following: the value of the measurement information obtained based on measurement of the CSI-RSs is greater than or equal to a determined threshold value; or the value of the measurement information obtained based on measurement of the CSI-RSs is the maximum value.

At S240, the terminal device obtains the target TA value from the target TA list.

In response to the target TA list only including one TA value, the target TA value is obtained from the target TA list, that is, this TA value included in the target TA list is used as the target TA value. In response to the target TA list only including at least two TA values, a target TA value is obtained from the target TA list, that is, a TA value is selected from the target list as the target TA value.

In an example, in response to obtaining, by the terminal device, the target TA list from the first TA list set according to at least one of the following: at least one SSB; at least one beam direction; or at least one group of CSI-RSs, obtaining, by the terminal device, the target TA value from the target TA list includes: obtaining, by the terminal device, the target TA value from the target TA list according to measurement information.

In response to the terminal device not obtaining the target TA list from the first TA list set according to the measurement information, that is, in response to the terminal device obtaining the target TA list from the first TA list set according to one of at least one SSB, at least one beam direction, or at least one group of CSI-RSs, the terminal device may obtain the target TA value from the target TA list according to the measurement information.

In an example, the target TA list includes M TA values, and there is correspondence between each TA value and a value interval of a piece of measurement information. In this example, the measurement information is RSRP, then the M TA values correspond to M RSRP value intervals, respectively. According to an RSRP value obtained through measurement, the terminal device determines an RSRP value interval in which the RSRP value is located, and then can learn about the TA value corresponding to the RSRP value interval, where this TA value is the target TA value.

In an example, the target TA list includes M TA values, and there is correspondence between each TA value and a value interval of two pieces of measurement information. For example, in response to the measurement information being RSRP and RSRQ, then M TA values correspond to M RSRP value intervals and M RSRQ value intervals, respectively (i.e., the target TA list is a two-dimensional table). According to an RSRP value and an RSRQ value obtained through measurement, the terminal device determines an RSRP value interval in which the RSRP value is located, and an RSRQ value interval in which the RSRQ value is located, and then can learn about the TA value corresponding to the RSRP interval and the RSRQ value interval, where this TA value is the target TA value.

In an example, the terminal device filters TA lists as the first TA list set based on the serving cell and the neighboring cells (the number or ID) as well as the TA list information, then selects a suitable TA list as the target TA list from the first TA list set based on the SSB, and finally selects a TA value as the target TA value from the target TA list based on the RSRP.

At S250, the terminal device adjusts a timing advance for uplink channel transmission using the target TA value.

Please refer to the previous implementation for details that are not explained in this implementation, which will not be repeated here.

Figure 3:
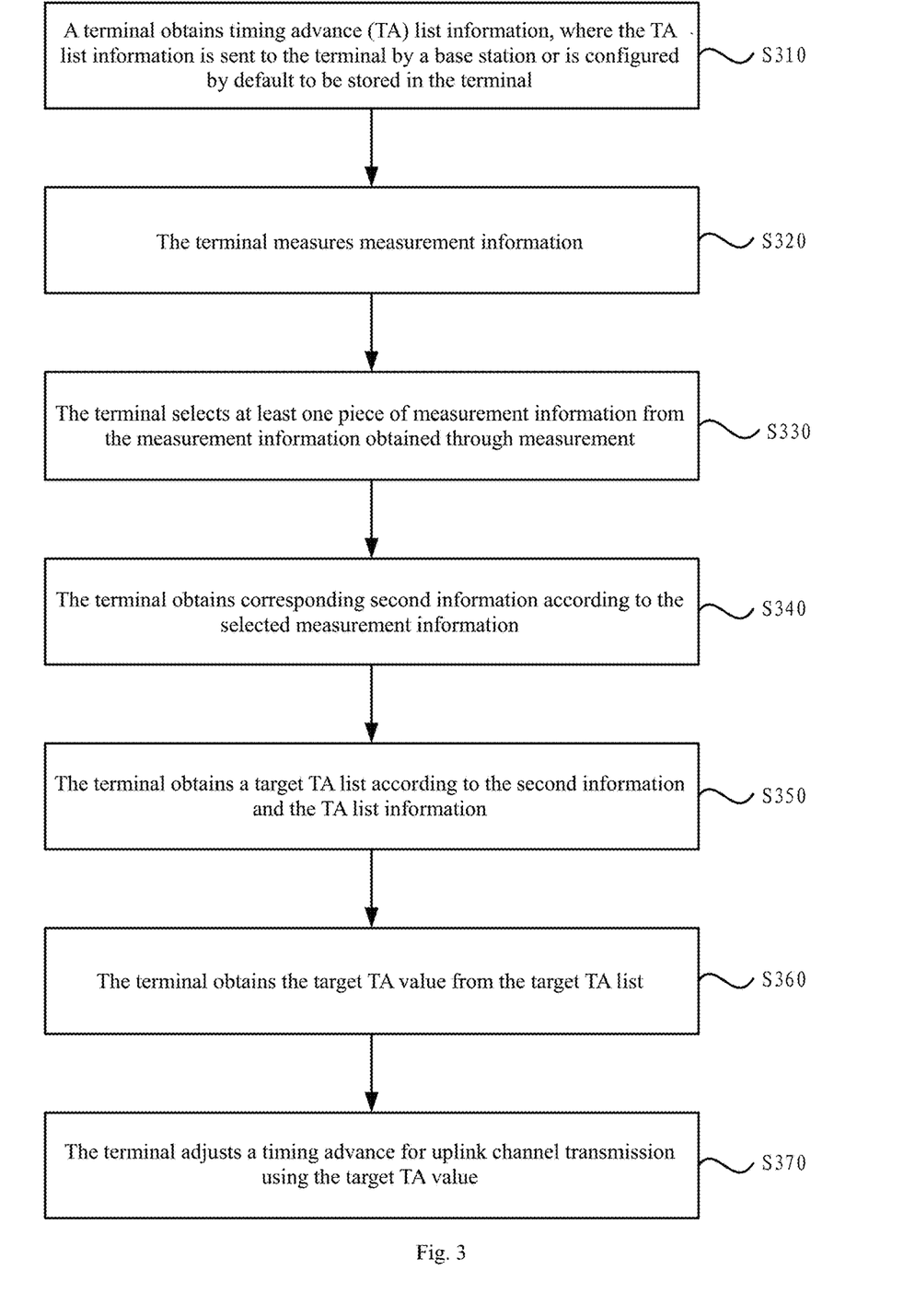
FIG. 3 is a flowchart of a method for determining a timing advance provided in the present disclosure.

In another example implementation, FIG. 3 is a flowchart of a method for determining a timing advance provided in the present disclosure. Here, obtaining, by the terminal device, a target TA list according to the TA list information includes:

measuring measurement information by the terminal device, where the number of pieces of measurement information is greater than or equal to 1, and one piece of measurement information corresponds to one piece of second information; selecting, by the terminal device, at least one piece of measurement information from the measurement information obtained through measurement; obtaining, by the terminal device, corresponding second information according to the selected measurement information; and obtaining, by the terminal device, the target TA list according to the second information and the TA list information, where the second information includes at least one of the following: at least one SSB; at least one beam direction; or at least one group of CSI-RSs.

As shown in FIG. 3, the method for determining a timing advance provided in the present disclosure includes the following steps.

At S310, a terminal device obtains timing advance (TA) list information, where the TA list information is sent to the terminal device by a base station or is configured by default to be stored in the terminal device.

The TA list information indicates at least two TA lists, the TA list including at least one TA value.

At S320, the terminal device measures measurement information.

The measurement information is obtained by the terminal device by measuring a reference signal or channel of a serving cell and/or a neighboring cell, where the reference signal includes at least one of SSB or CSI-RS. The measurement information includes at least one of RSRP, RSRQ or RSSI.

The number of pieces of measurement information is greater than or equal to 1, and one piece of measurement information corresponds to one piece of second information, where the second information includes at least one of at least one SSB, at least one beam direction, or at least one group of CSI-RSs.

In response to the SSBs being different or the beam directions being different or the groups of CSI-RS s being different, the terminal device measures the corresponding measurement information, respectively. In an example, the measurement information measured by the terminal device is RSRP, and when measuring RSRPs of different beam directions, each piece of measurement information RSRP obtained through measurement by the terminal device is one beam direction.

At S330, the terminal device selects at least one piece of measurement information from the measurement information obtained through measurement.

For example, when measuring RSRPs of different beam directions, the terminal device selects at least one RSRP from the measured plurality of RSRPs, such as selecting the RSRP with the largest value.

At S340, the terminal device obtains corresponding second information according to the selected measurement information.

The terminal device may determine the corresponding SSB index or beam direction or group of CSI-RSs based on the selected measurement information. In an example, when measuring RSRPs of different beam directions, the terminal device may determine the corresponding beam direction according to the selected RSRP.

At S350, the terminal device obtains the target TA list according to the second information and the TA list information.

The terminal device obtains the target TA list based on the determined SSB or beam direction or group of CSI-RSs, as well as the TA list information.

In an example, after determining the SSB based on the selected measurement information, a TA list corresponding to the SSB is acquired as the target TA list based on the TA list information. In this example, there is correspondence between the TA list and 2 SSBs. Assuming that the base station is configured with 4 SSBs having indexes SSB0, SSB1, SSB2, and SSB3, respectively, and defined as follows: SSB0 and SSB 1 correspond to TA list 0, and SSB2 and SSB3 correspond to TA list 1. In response to the index of the SSB determined by the terminal device according to the selected measurement information being SSB 1, TA list 0 is the target TA list, that is, the target TA value of the terminal device exists in TA list 0; and in response to the index of the SSB determined by the terminal device according to the selected measurement information being SSB3, TA list 1 is the target TA list, that is, the target TA value of the terminal device exists in TA list 1.

In an example, after determining the beam direction based on the selected measurement information, a TA list corresponding to the beam direction is acquired as the target TA list based on the TA list information. In this example, there is correspondence between the TA list and 1 beam direction. Assuming that the base station is configured with 4 beam directions having indexes beam direction 0, beam direction 1, beam direction 2, and beam direction 3, respectively, and defined as follows: beam direction 0 corresponds to TA list 0, beam direction 1 corresponds to TA list 1, beam direction 2 corresponds to TA list 2, and beam direction 3 corresponds to TA list 3. In response to the beam direction determined by the terminal device according to the selected measurement information being beam direction 1, TA list 1 is the target TA list, that is, the target TA value of the terminal device exists in TA list 1. In this example, the base station may directly configure an explicit beam direction, and the base station may also implicitly indicate the beam direction by configuring the SSB and/or CSI-RS, that is, one SSB and/or CSI-RS corresponds to one beam direction.

In an example, after determining the group of CSI-RSs based on the selected measurement information, a TA list corresponding to the group of CSI-RSs is acquired as the target TA list based on the TA list information. A corresponding target TA list may be acquired based on a group index of the determined group of CSI-RSs as well as the TA list information.

In an example, the terminal device measures RSRPs of different beam directions of its serving cell, selects a value from the plurality of RSRPs obtained through measurement, and determines the corresponding beam direction based on the selected RSPR value, and then selects the corresponding TA list as the target TA list based on the determined beam direction and the TA list information.

At S360, the terminal device obtains the target TA value from the target TA list.

In response to the target TA list only including one TA value, the target TA value is obtained from the target TA list, that is, this TA value included in the target TA list is used as the target TA value. In response to the target TA list only including at least two TA values, a target TA value is obtained from the target TA list, that is, a TA value is selected from the target list as the target TA value.

In an example, obtaining, by the terminal device, the target TA value from the target TA list includes: obtaining, by the terminal device, the target TA value from the target TA list according to the selected measurement information.

In an example, the target TA list includes M TA values, and there is correspondence between each TA value and a value interval of a piece of measurement information. In this example, the selected measurement information is RSRP, then the M TA values correspond to M RSRP value intervals, respectively. According to the selected measurement information, i.e., the RSRP value, the terminal device determines an RSRP value interval in which the RSRP value is located, and then can learn about the TA value corresponding to the RSRP value interval, where this TA value is the target TA value.

At S370, the terminal device adjusts a timing advance for uplink channel transmission using the target TA value.

Please refer to the previous implementation for details that are not explained in this implementation, which will not be repeated here.

Figure 4:
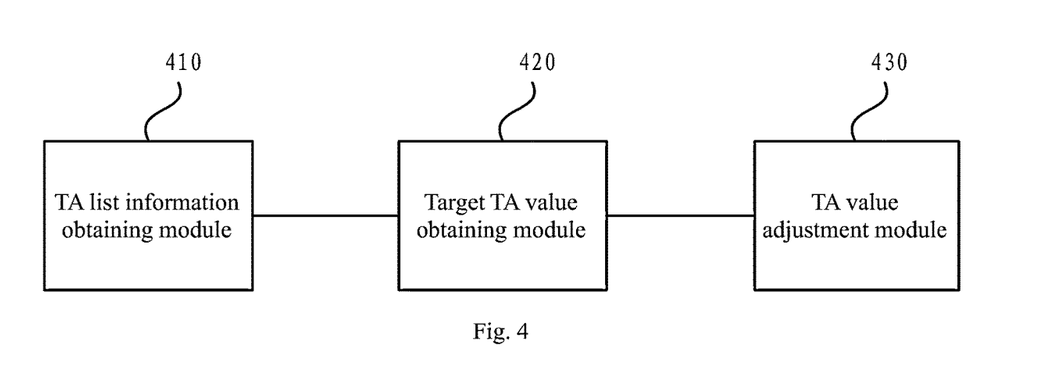
FIG. 4 a structural schematic diagram of an apparatus for determining a timing advance provided in the present disclosure.

This embodiment further provides an apparatus for determining a timing advance. FIG. 4 is a structural schematic diagram of the apparatus for determining a timing advance provided in the present disclosure. The apparatus for determining a timing advance provided in an embodiment of the present disclosure may be implemented by software and/or hardware and integrated in a communication terminal device, and as shown in FIG. 4, the apparatus includes: a TA list information obtaining module 410, a target TA value obtaining module 420, and a TA value adjustment module 430, where the TA list information obtaining module 410 is configured to obtain timing advance (TA) list information, where the TA list information is sent to the terminal device by a base station or is configured by default to be stored in the terminal device; the target TA value obtaining module 420 is configured to obtain a target TA value according to the TA list information; and the TA value adjustment module 430 is configured to adjust a timing advance for uplink channel transmission using the target TA value, where the TA list information indicates at least one TA list, the TA list including at least one TA value.

In the technical scheme provided in this embodiment, the TA list information is configured by default to be stored in the terminal device, or the TA list information is set to be sent by the base station to the terminal device before uplink synchronization of the terminal device with the base station, so that the terminal device can directly acquire, according to the TA list information, the target TA value for adjusting the timing advance for uplink channel transmission. This technical scheme can achieve the terminal device uplink adaptive synchronization process without requiring the support of the random access process, thereby speeding up the terminal device uplink synchronization process and reducing the resource overhead of messages for uplink synchronization.

In response to the TA list information indicating at least two TA lists, the target TA value obtaining module 420 includes: a target TA list obtaining unit and a target TA value obtaining unit, where the target TA list obtaining unit is configured to obtain a target TA list according to the TA list information; and the target TA value obtaining unit is configured to obtain a target TA value from the target TA list.

In an example, there is correspondence between the TA list and at least one of the following: at least one piece of measurement information, where the measurement information is obtained by the terminal device by measuring a reference signal or channel of a serving cell and/or a neighboring cell; at least one SS/PBCH Block (SSB) index; at least one beam direction; at least one group of channel-state information reference signals (CSI-RSs); a serving cell ID; at least one neighboring cell ID; the number of neighboring cells; or positioning information for the terminal device; and the target TA list obtaining unit is configured to obtain a target TA list according to the correspondence as well as the TA list information.

The measurement information includes at least one of the following: reference signal receiving power; reference signal receiving quality; or received signal strength indication.

In an example, the target TA list obtaining unit includes: a first TA list set obtaining subunit configured to obtain a first TA list set according to the TA list information; and a target TA list obtaining subunit configured to obtain the target TA list from the first TA list set, where the terminal device obtains the first TA list set according to the TA list information and one of the following: a serving cell ID; a serving cell ID and a neighboring cell ID; a serving cell ID and the number of neighboring cells; or positioning information for the terminal device; and where the first TA list set includes at least one TA list.

The target TA list obtaining subunit is configured to obtain the target TA list from the first TA list set according to at least one of the following: at least one piece of measurement information; at least one SSB; at least one beam direction; or at least one group of CSI-RSs.

In response to obtaining, by the terminal device, the target TA list from the first TA list set according to at least one of the following: at least one SSB; at least one beam direction; or at least one group of CSI-RSs, the target TA value obtaining unit is configured to obtain the target TA value from the target TA list according to the measurement information.

In an example, the target TA list obtaining unit is configured to measure measurement information, where the number of pieces of measurement information is greater than or equal to 1, and one piece of measurement information corresponds to one piece of second information; select, by the terminal device, at least one piece of measurement information from the measurement information obtained through measurement; obtain, by the terminal device, corresponding second information according to the selected measurement information; and obtain, by the terminal device, the target TA list according to the second information and the TA list information, where the second information includes at least one of the following: at least one SSB; at least one beam direction; or at least one group of CSI-RSs.

The target TA value obtaining unit is configured to obtain the target TA value from the target TA list according to the selected measurement information.

The terminal device is in at least one of the following states: a radio resource control-idle (RRC_IDLE) state; an inactive state; a radio resource control-connected (RRC_CONNECTED) state, where the terminal device receives TA update trigger information or TA reconfiguration information; a radio resource control-idle (RRC_IDLE) state, where the terminal device transmits a service using a physical uplink shared channel (PUSCH); a random access process, where random access information sent by the terminal device at least includes random access preamble information and load information; or autonomous transmission of a sounding reference signal (SRS).

The apparatus for determining a timing advance provided in this embodiment is used to implement the method for determining a timing advance as described in an embodiment of the present disclosure, and the implementation principle and technical effect of the apparatus for determining a timing advance provided in this embodiment are similar to those of the method for determining a timing advance as described in an embodiment of the present disclosure, and will not be repeated here.

Figure 5:
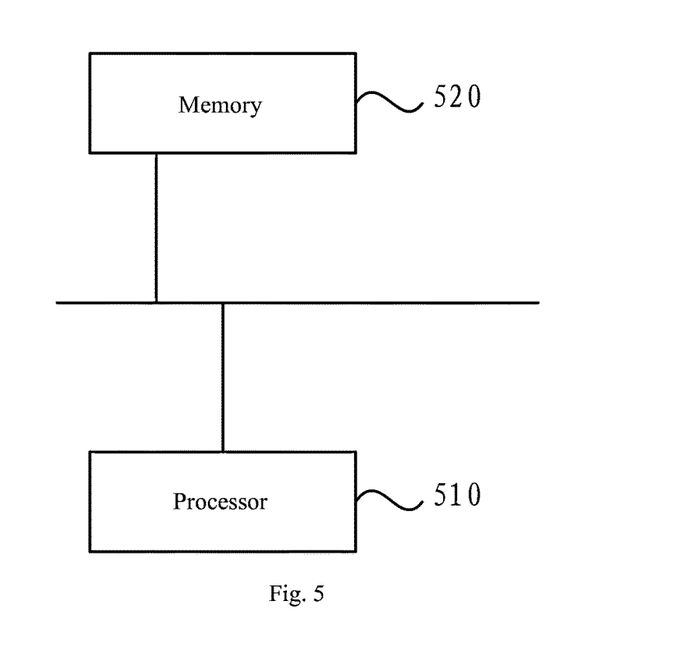
FIG. 5 is a structural schematic diagram of a communication terminal device provided in the present disclosure.

An embodiment of the present disclosure provides a communication terminal device. FIG. 5 is a structural schematic diagram of a communication terminal device provided in the present disclosure. As shown in FIG. 5, the communication terminal device provided in the present disclosure includes: at least one processor 510 and a memory 520. The communication device may be provided with one or more processors 510, while one processor 510 is shown as an example in FIG. 5. The memory 520 is configured to store at least one program; and the at least one program, when executed by the at least one processor 510, causes the at least one processor 510 to implement the method for determining a timing advance as described in an embodiment of the present disclosure.

The processor 510 and the memory 520 in the communication device may be connected by a bus or in other ways, and in FIG. 5, the bus connection is taken as an example.

The memory 520, as a non-transitory computer-readable storage medium, may be configured to store software programs, computer-executable programs and modules, such as program instructions/modules (for example, the TA list information obtaining module 410, the target TA value obtaining module 420, and the TA value adjustment module 430 in the apparatus for determining a timing advance as shown in FIG. 4) corresponding to the method for determining a timing advance as described in an embodiment of the present disclosure. The memory 520 may include a storage program area and a storage data area, where the storage program area may store an operating system and application program(s) required by at least one function, and the storage data area may store data created according to the use of a device, etc. In addition, the memory 520 may include a high-speed random access memory and a non-volatile memory, for example, at least one magnetic disk storage device, a flash memory device, or another non-volatile solid-state storage device. In some examples, the memory 520 may include memories remotely located with respect to the processor 510, and these remote memories may be connected to communication devices via a network. Examples of the above-mentioned network include the Internet, an intranet, a local area network, a mobile communication network, and a combination thereof.

A further embodiment of the present disclosure provides a non-transitory computer-readable storage medium storing a computer program which, when executed by a processor, causes the processor to implement the method for determining a timing advance as described in any of the embodiments of the present disclosure. The method includes: obtaining, by a terminal device, timing advance (TA) list information, where the TA list information is sent to the terminal device by a base station or is configured by default to be stored in the terminal device; obtaining, by the terminal device, a target TA value according to the TA list information; and adjusting, by the terminal device, a timing advance for uplink channel transmission using the target TA value, where the TA list information indicates at least one TA list, the TA list including at least one TA value.

Optionally, the computer-executable instructions, when executed by the computer processor, may also be used to execute the method for determining a timing advance as described in any of the embodiments of the present disclosure.

Through the description of the above embodiments, the present disclosure may be implemented by means of software and necessary general-purpose hardware, and may alternatively be implemented by hardware. The technical schemes of the present disclosure may be embodied substantially in the form of software products, which may be stored in a computer-readable storage medium (such as a floppy disk, read-only memory (ROM), random access memory (RAM), flash, hard disk and optical disk) and include instructions to cause a communication device (such as a personal computer, a server, or a network device) to perform the methods of the embodiments of the present disclosure.

In the above-described embodiment of the apparatus for determining a timing advance, the units and modules included are divided only according to functional logic, but are not limited to the above division, as long as the corresponding functions can be achieved. In addition, the names of the functional units are only for the convenience of distinguishment, and are not used to limit the scope of protection of the present disclosure.

The above-described embodiments are only example embodiments of the present disclosure, and are not intended to limit the scope of protection of the present disclosure.

The term "user terminal device" covers any suitable type of wireless user equipment, such as mobile phones, portable data processing equipment, portable web browsers or vehicle-mounted mobile stations.

Generally speaking, various embodiments of the present disclosure can be implemented in hardware or dedicated circuits, software, logic or any combination thereof. For example, some aspects can be implemented in hardware, while other aspects can be implemented in firmware or software that can be executed by a controller, a microprocessor or another computing device. However, the present disclosure is not limited thereto.

Embodiments of the present disclosure can be implemented by a data processor of a mobile device executing computer program instructions, for example, in a processor entity, or by hardware, or by a combination of software and hardware. The computer program instructions may be assembly instructions, Instruction Set Architecture (ISA) instructions, machine instructions, machine-related instructions, microcode, firmware instructions, state setting data or source code or object code written in any combination of one or more programming languages.

The block diagram of any logic process in the drawings of the present disclosure can represent program steps, or can represent interconnected logic circuits, modules and functions, or can represent a combination of program steps and logic circuits, modules and functions. The computer program may be stored in a memory. The memory may be of any type that is suitable for a local technical environment and can be implemented using any suitable data storage technology, for example but not limited to, a read-only memory (ROM), a random-access memory (RAM), optical storage devices and systems (a digital versatile disk (DVD) or a compact disk (CD)). The computer-readable storage medium may include a non-transitory storage medium. The data processor may be any type suitable for the local technical environment, for example but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

The invention claimed is:

1. A method for determining a timing advance, comprising:
   obtaining, by a terminal device, timing advance (TA) list information, wherein the TA list information is sent to the terminal device by a base station or is configured by default to be stored in the terminal device, and the TA list information indicates at least one TA list, each TA list comprising at least one TA value;
   obtaining, by the terminal device, a target TA value according to the TA list information; and
   adjusting, by the terminal device, a TA for uplink channel transmission using the target TA value;
   wherein in response to the TA list information indicating at least two TA lists, obtaining, by the terminal device, a target TA value according to the TA list information comprises:
   obtaining, by the terminal device, a target TA list according to the TA list information; and
   obtaining, by the terminal device, the target TA value from the target TA list.

2. The method of claim 1, wherein:
   each TA list has a correspondence with at least one of:
   at least one piece of measurement information, wherein each piece of measurement information is obtained by the terminal device by measuring a reference signal or channel of at least one of a serving cell or a neighboring cell;
   at least one SS/PBCH Block (SSB) index;
   at least one beam direction;
   at least one group of channel-state information reference signals (CSI-RSs);
   a serving cell identifier (ID);
   at least one neighboring cell ID;
   a number of neighboring cells; or
   positioning information for the terminal device;
   and
   obtaining, by the terminal device, a target TA list according to the TA list information comprises:
   obtaining, by the terminal device, the target TA list according to the correspondence and the TA list information.

3. The method of claim 2, wherein the measurement information comprises at least one of:
   reference signal receiving power;
   reference signal receiving quality; or
   received signal strength indication.

4. The method of claim 1, wherein:
   obtaining, by the terminal device, a target TA list according to the TA list information comprises:
   obtaining, by the terminal device, a first TA list set according to the TA list information; and
   obtaining, by the terminal device, the target TA list from the first TA list set,
   the terminal device obtains the first TA list set according to the TA list information and one of:
   a serving cell ID;
   a serving cell ID and a neighboring cell ID;
   a serving cell ID and the number of neighboring cells; or
   positioning information for the terminal device;
   and
   the first TA list set comprises at least one TA list.

5. The method of claim 4, wherein obtaining, by the terminal device, the target TA list from the first TA list set comprises:
   obtaining, by the terminal device, the target TA list from the first TA list set according to at least one of:
   at least one piece of measurement information;
   at least one SSB index;
   at least one beam direction; or
   at least one group of CSI-RSs.

6. The method of claim 1, wherein:
   in response to obtaining, by the terminal device, the target TA list from the first TA list set according to at least one of:
   at least one SSB index;
   at least one beam direction; or
   at least one group of CSI-RSs,
   and
   obtaining, by the terminal device, the target TA value from the target TA list comprises:
   obtaining, by the terminal device, the target TA value from the target TA list according to measurement information.

7. The method of claim 1, wherein:
   obtaining, by the terminal device, a target TA list according to the TA list information comprises:
   measuring, by the terminal device, at least one piece of measurement information, wherein each piece of measurement information corresponds to a piece of second information;
   selecting, by the terminal device, at least one piece of measurement information from the at least one piece of measurement information obtained through measurement;
   obtaining, by the terminal device, second information corresponding to the selected measurement information according to the selected measurement information; and
   obtaining, by the terminal device, the target TA list according to the TA list information and the second information corresponding to the selected measurement information,
   and
   each piece of second information comprises at least one of:
   at least one SSB index;
   at least one beam direction; or
   at least one group of CSI-RSs.

8. The method of claim 7, wherein obtaining, by the terminal device, the target TA value from the target TA list comprises:
   obtaining, by the terminal device, the target TA value from the target TA list according to the selected measurement information.

9. The method of claim 1, wherein the terminal device is in at least one of the following states:
   a radio resource control-idle (RRC_IDLE) state;
   an inactive state;
   a radio resource control-connected (RRC_CONNECTED) state, where the terminal device receives TA update trigger information or TA reconfiguration information;
   an RRC_IDLE state, where the terminal device transmits a service using a physical uplink shared channel (PUSCH);
   a random access process, where random access information sent by the terminal device at least comprises random access preamble information and load information; or
   autonomous transmission of a sounding reference signal (SRS).

10. A communication terminal device, comprising:
at least one processor;
a memory configured to store at least one program, wherein
the at least one program, when executed by the at least one processor, causes the at least one processor to implement a method for determining a timing advance comprising:
obtaining, by a terminal device, timing advance (TA) list information, wherein the TA list information is sent to the terminal device by a base station or is configured by default to be stored in the terminal device, and the TA list information indicates at least one TA list, each TA list comprising at least one TA value;
obtaining, by the terminal device, a target TA value according to the TA list information; and
adjusting, by the terminal device, a TA for uplink channel transmission using the target TA value;
wherein in response to the TA list information indicating at least two TA lists, obtaining, by the terminal device, a target TA value according to the TA list information comprises:
obtaining, by the terminal device, a target TA list according to the TA list information; and
obtaining, by the terminal device, the target TA value from the target TA list.

11. A non-transitory computer-readable storage medium storing a computer program which, when executed by a processor, causes the processor to implement the method for determining a timing advance of claim 1.

12. The method of claim 5, wherein:
in response to obtaining, by the terminal device, the target TA list from the first TA list set according to at least one of:
at least one SSB index;
at least one beam direction; or
at least one group of CSI-RSs,
and
obtaining, by the terminal device, the target TA value from the target TA list comprises:
obtaining, by the terminal device, the target TA value from the target TA list according to measurement information.

* * * * *